(No Model.)
G. J. CARSON.
INSULATING JOINT.
No. 554,332. Patented Feb. 11, 1896.
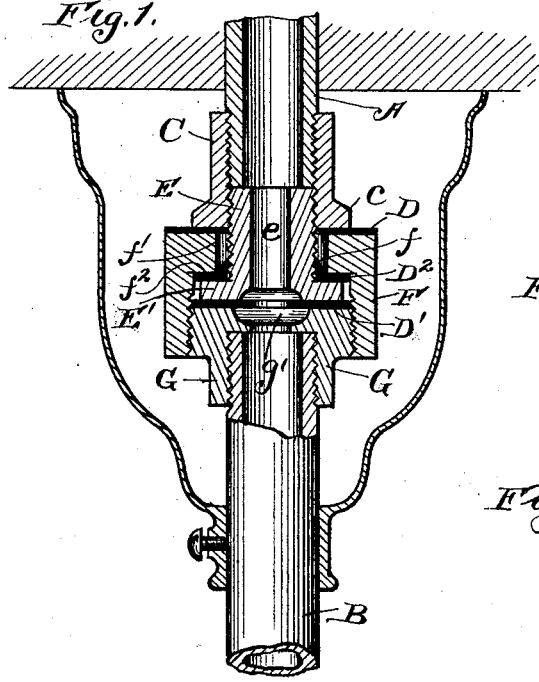
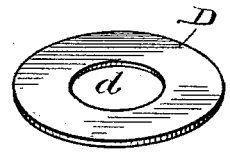
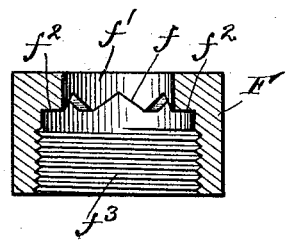
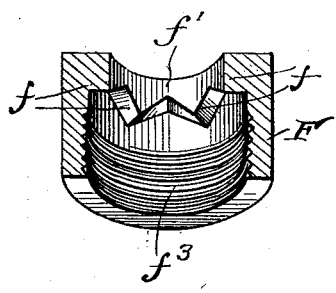
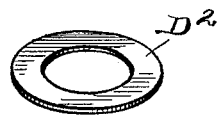
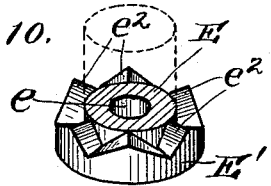
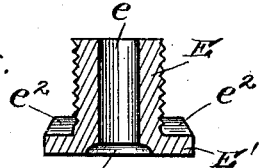
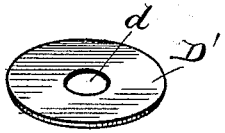
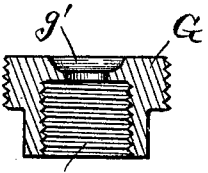
Witnesses:
R. J. Jacker.
E. A. Duggan.
Inventor:
George J. Carson.
By Chas. C. Tillman
Atty.

UNITED STATES PATENT OFFICE.

GEORGE J. CARSON, OF CHICAGO, ILLINOIS.

INSULATING-JOINT.

SPECIFICATION forming part of Letters Patent No. 554,332, dated February 11, 1896.

Application filed September 23, 1895. Serial No. 563,327. (No model.)

*To all whom it may concern:*

Be it known that I, GEORGE J. CARSON, a citizen of the United States, residing at Chicago, in the county of Cook and State of Illinois, have invented certain new and useful Improvements in Insulating-Joints, of which the following is a specification.

This invention relates to improvements in joints or couplings, and while it is more especially designed to be used in uniting pipes employed in gas-fixtures and other fixtures for illuminating purposes to the supply-pipe, yet it may be used for other purposes; and it consists in certain peculiarities of the construction, novel arrangement and operation of the various parts thereof, as will be hereinafter more fully set forth and specifically claimed.

The objects of my invention are, first, to provide an insulating-joint which shall be simple and inexpensive in construction, strong and durable, and effective in operation, and, second, such a joint or coupling which shall afford absolute and perfect insulation, and by reason of the peculiar construction and formation of its parts will be so strongly and securely locked that all danger of impairment of the fixture at the joint or coupling is removed.

In order to enable others skilled in the art to which my invention pertains to make and use the same, I will now proceed to describe it, referring to the accompanying drawings, in which—

Figure 1 is a central vertical sectional view of my joint or coupling, showing it uniting the gas-fixture to the supply-pipe. Fig. 2 is a central sectional view of the upper securing-collar. Fig. 3 is a perspective view of an insulating disk or washer. Fig. 4 is a sectional view of the locking-collar, showing the internal teeth or corrugations thereof. Fig. 5 is an insulating disk or washer used on said corrugations or teeth. Fig. 6 is a sectional view of the internal locking piece or bolt. Fig. 7 is a perspective view of an insulating disk or washer to be applied on the bottom of the piece or bolt. Fig. 8 is a central sectional view of the lower uniting-collar. Fig. 9 is a perspective view, partly in section, of the locking or exterior collar; and Fig. 10 is a similar view of the interior locking-piece.

Similar letters refer to like parts throughout different views of the drawings.

A represents a gas or supply pipe to which the pipe B of the fixture is united by means of my insulating joint or coupling. The lower portion of the pipe A is provided with external screw-threads, as is also the upper part of the pipe of the fixture. On the screw-threaded portion of the pipe A is secured a collar C, which is internally screw-threaded and is provided at its lower portion with an external annular rim or flange $c$, which rests on and holds in position the insulating-disk D, which may be made of any suitable non-electric conducting material, but preferably of mica. This disk is formed with a central opening $d$, of a size sufficiently large to admit of the insertion therethrough of the internal locking-piece E, which is provided with a vertical opening $e$, and is externally screw-threaded to engage the threads of the collar C.

The lower portion of the opening $e$ in the locking-piece E is enlarged, as at $e'$, for the purpose presently to be explained. The lower portion of the piece E is formed or provided with an annular rim or flange $E'$, having on its upper surface corrugations or teeth $e^2$, which are preferably angular in form and are adapted to engage or mesh with corresponding corrugations or teeth $f$ in the main or locking collar F, which is provided with a central opening $f'$, somewhat larger in diameter than the stem of the piece or bolt E. The lower portion of the opening $f'$ in the locking-collar F is enlarged, so as to form an internal rim $f^2$, in which the corrugations or teeth $f$ are formed, and is provided with screw-threads $f^3$ to engage similar threads on the external portion of the lower uniting-collar G, which collar is provided with a screw-threaded central opening $g$, somewhat enlarged, as at $g'$, in its top.

As shown in Fig. 1 of the drawings, the uniting-collar G engages the screw-threads on the fixture-pipe B, and said collar is separated at its top from the lower portion of the locking-piece E by means of the insulating disk or washer D', which is provided with a central opening for the passage of the gas. Between the corrugations or teeth $f$ in the locking-collar F and the correspondingly-shaped teeth or corrugations $e^2$ on the flange E' of the interior locking-piece E is placed and secured a ring or washer D² of insulating material.

From the foregoing and by reference to the drawings it will be seen and readily understood that by securing the uniting-collar C on the supply-pipe A and also fixing the lower uniting-collar G on the fixture-pipe B said pipes will be in condition to be united by means of my coupling or joint, which is performed by inserting the locking-piece E through the opening $f'$ in the main or exterior locking-collar and screwing the said bolt or piece into the uniting-collar C, which operation will draw the upper surface of the collar F, on which is placed an insulating washer or disk D, against the lower surface of the annular rim or flange $c$ of the upper uniting-collar, and at the same time will cause the teeth or corrugations on the piece E to engage the corresponding teeth or corrugations in the locking-collar F and to firmly secure therebetween the insulating washer or disk D², which surrounds the stem or bolt E, and lies on the teeth $a^2$ of the flange E' thereof. On the upper surface of the lower uniting-collar G is placed an insulating disk or washer D', having a central opening $d$ to correspond with the opening in said collar, which, as before stated, is attached to the fixture-pipe. The collar G is then screwed into the lower portion of the locking-collar F and clamps the insulator D' firmly between it, the collar G, and the bottom of the locking-piece E, as is clearly shown in Fig. 1 of the drawings.

By the foregoing arrangement of the various parts of the joint or coupling-piece it is apparent that I attain a very strong joint in which the supply and fixture pipes are absolutely and perfectly insulated one from the other, so that it would be impossible for an electric current to pass from one to the other. In order to more effectually prevent the current passing through the opening in the insulator D' from the collar G to the locking-piece E, the adjacent portions of the openings in each of said pieces are enlarged, as shown at $g'$ and $e'$, respectively.

By reference to Fig. 1 of the drawings it will be observed that the locking-piece E and the flange E' thereon is of smaller diameter than the opening $f'$ in the exterior locking-collar, and that when in position, as shown in Fig. 1 of the drawings, there will be a space between the periphery of the annular rim or flange E' and the wall of the opening in the said locking-collar, which space may be filled with any suitable material. The stem or piece E, being smaller than the opening $f'$, is caused to center in said opening by reason of the engagement of the teeth $e^2$ with the teeth $f$ on said collar, which teeth afford a very secure lock or fastening for said parts, and in some instances may be used as a coupling for pipes or other devices in which an insulator is not required.

While I may make the insulating washers or disks D, D', and D² of any suitable non-electric-conducting material, yet I prefer to use mica, which I have found by experiments to be especially adapted for use in my joint, and more particularly between the teeth or corrugations on the locking-piece E and main locking-collar.

Having thus fully described my invention, what I claim as new, and desire to secure by Letters Patent, is—

1. The combination with a uniting-collar on the ends of two pieces to be joined together, a main locking-collar engaging the collar on one of said pieces, and formed with an opening or chamber provided with an annular rim having teeth or corrugations, and an interior locking-piece having an annular flange provided with teeth or corrugations to correspond with and engage those of said locking-collar, and adapted to be secured to the other piece to be united, substantially as described.

2. In an insulating-joint the combination of the collar C, secured to the supply-pipe, with the collar G, on the fixture-pipe, the main locking-collar F, having the opening $f'$, provided with the annular rim $f^2$, formed with teeth or corrugations $f$, and engaging the collar G, the insulating disks or washers D, and D', on the tops of the collars F, and G, respectively, the locking-piece E, having the annular flange E', provided with teeth or corrugations $e^2$, located within the collar F, and adapted to engage its teeth and the collar C, and the insulating disk or washer D², located between the teeth of the piece E, and the collar F, and adapted to be clamped thereby, substantially as described.

GEORGE J. CARSON.

Witnesses:
   CHAS. C. TILLMAN,
   FRANK F. KINNEY.